B. D. CHAMBERLIN.
PROCESS FOR THE PRODUCTION OF BLOWN GLASS ARTICLES.
APPLICATION FILED APR. 21, 1913. RENEWED APR. 23, 1915.
1,148,215.       Patented July 27, 1915.
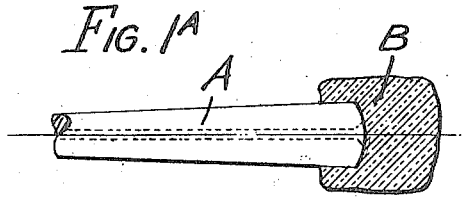
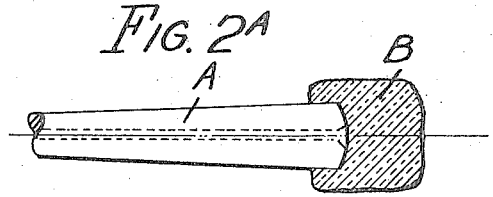
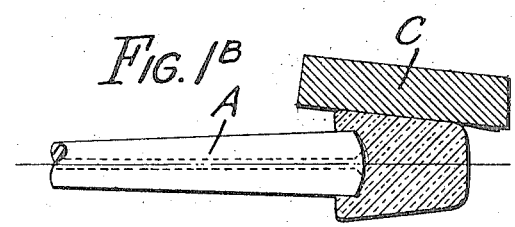
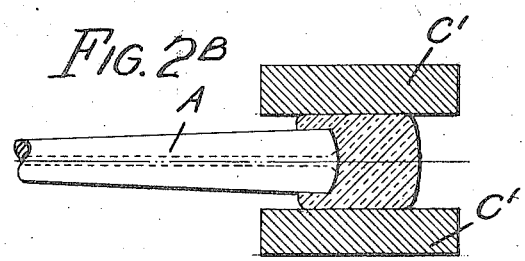
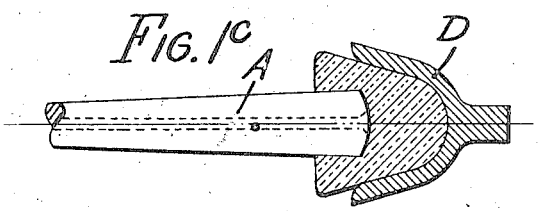
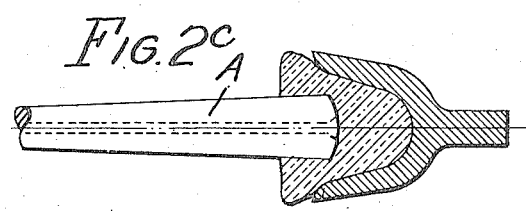
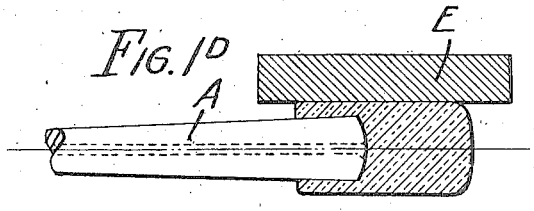
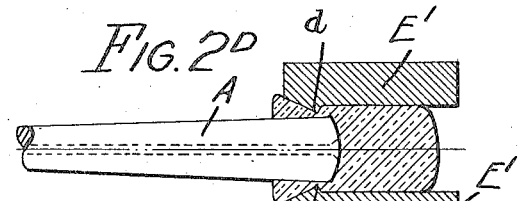
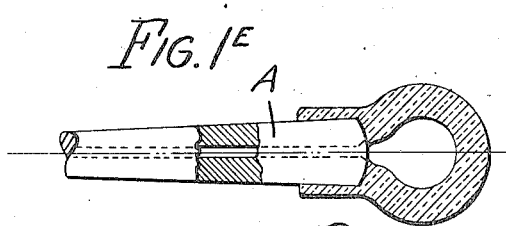
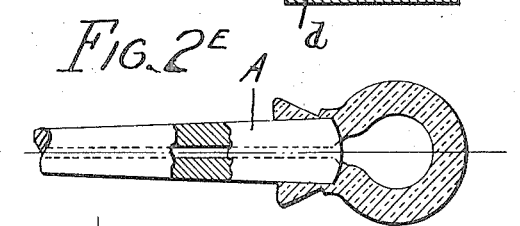
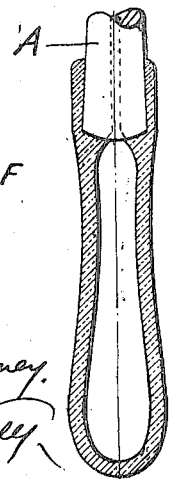
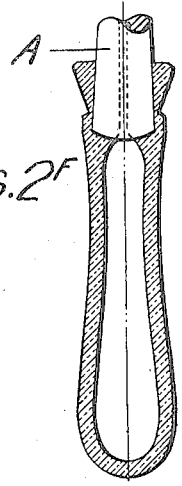
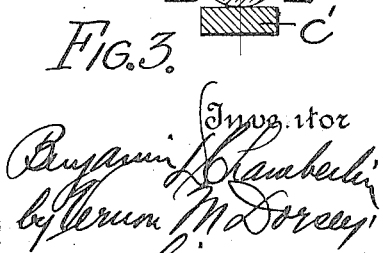

UNITED STATES PATENT OFFICE.

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

PROCESS FOR THE PRODUCTION OF BLOWN GLASS ARTICLES.

1,148,215. Specification of Letters Patent. Patented July 27, 1915.

Application filed April 21, 1913, Serial No. 762,559. Renewed April 23, 1915. Serial No. 23,504.

*To all whom it may concern:*

Be it known that I, BENJAMIN D. CHAMBERLIN, a citizen of the United States, and a resident of Corning, county of Steuben, and State of New York, have invented certain new and useful Improvements in Processes for the Production of Blown Glass Articles, of which the following is a specification.

In the usual process of manufacturing certain blown glass articles on blow pipes (such as electric lamp bulbs), it is the practice to insert a blow-pipe into a pot of molten glass, and having gathered on the end of the blow-pipe a certain quantity or " gather " of glass to marver or otherwise shape such gather into a blank, which surrounds the end of the blow-pipe and projects from and beyond the end thereof. The blank is then elongated and inserted in a suitable mold and blown, whereby the glass forming that portion of the blank which projects beyond the end of the blow-pipe enters into the formation of the finished article.

For the uniform production of successive articles, and especially to maintain the walls thereof of equal thickness, it is important that the parts of the successive blanks which enter into and form the finished article be identical in size, shape, mass and structure, and my invention relates to a process whereby this identity can be closely obtained with a consequent improvement in the character of the output.

For the purposes above set forth, my invention involves the shaping of the gathers into blanks which are uniform in the parts thereof going to form the finished article by forcing any excess of glass beyond a desired volume rearwardly on the iron, where it will not be blown, this being by preference accomplished by the impact of a suitable gage mold upon the end of the gather, the inclusion of the glass within the mold for this purpose being only momentary.

The matter above set forth forms the subject-matter of my prior application, Serial No. 674,814, filed February 1, 1912, while apparatus suitable therefor is shown in application #716,915, filed August 24, 1912.

My invention for which I now seek a patent by this application comprises a segregation of similar portions of the uniform portions of the successive gathers from the non-uniform parts, preliminary to elongating such uniform portions and to blowing the same to shape while on the iron. The segregation above referred to may be effected by forming a groove in each blank at the desired point, whereby the glass adjacent thereto is chilled, and whereby upon the subsequent elongation, the part of the gather which flows down is the portion below such divisional point.

My present invention further comprises, in its most perfected form, a marvering of the glass between marverers movable toward each other to a predetermined and uniform extent, and contacting with the glass at more than two points, which are so located that the pressures thereof balance each other, and which prevent the movement of the blank while being operated on away from the center of the circle determined by the marvering points.

In the accompanying sheets of drawings, Figures 1ª to 1ᶠ represent steps in the process shown and described in my prior application Serial No. 674,814, above referred to, and are shown herein for the purpose of illustrating the difference between my prior application and this application. Figs. 2ª to 2ᶠ represent successive steps in the process that forms the subject-matter of this application. Fig. 3 shows how a plurality of marverers may be used in carrying out the steps represented in Figs. 2ᵇ and 2ᵈ.

Referring now to Figs. 1ª to 1ᶠ, the several steps of the process there represented consist in affixing on the end of a blow-pipe A, a gather of glass B, as shown in Fig. 1ª. This may be accomplished by dipping the blow-pipe in molten glass or in any other desired manner. The gather is then while the blow-pipe is rotated, marvered, by bringing it into contact with a suitable marverer C, to give it, as shown at Fig. 1ª, the shape of an irregular truncated cone, having the desired diameter, and to render it solid and homogeneous, and to work back on the blow-pipe to a greater or less extent, the e :cess of the gather. After this marvering, a gage mold D is, while the blow-pipe is rotated, momentarily projected out and over the free end of the blank, to a definite distance (see Fig. 1ᶜ), and is instantly and as quickly as it can be accomplished, withdrawn. Inasmuch as the cavity of this mold has a definite capacity, which is less than the volume of glass left by the preceding marvering projecting beyond the end of the blow-pipe, and is projected to a fixed distance in respect to the end of the blow-pipe, it follows that any surplus glass over the capacity of the gage mold will be forced back upon the blow-pipe, the sides of the mold limiting the side flow of the glass. As only that part of the gather which extends beyond the end of the blow-pipe generally becomes distributed to form the finished article, it will be seen that each blank after the gaging, consists of an uniform quantity of glass which will be utilized in the manufacture of the finished article. It is desirable that this gaging of the blank be done by the impact of the mold, and that it be not a slow flow of the glass requiring a prolongation of the contact of the mold therewith, as under the latter conditions the glass will either adhere to the mold, be unduly cooled, or the blank will be twisted by the rotation of the blow-pipe. None of these objections, however, would be present in the same degree if the momentary contact between the gather and the gage mold be repeated at short intervals, each of the contacts being momentary.

Upon the retraction of the gage mold, the gaged blank is again marvered, as is shown in Fig. 1$^d$, by rotation on a suitable marverer E, whereby it is made into a cylinder, but by which the mass of glass projecting from the end of the blow-pipe as determined by the gage mold is not materially altered, and an initial cavity is then formed in that part of the blank which has been measured, and is beyond the end of the blow-pipe, by air introduced through the pipe (see Fig. 1$^e$). All of the steps before described are by preference accomplished while the blow pipe is rotating, and while the end of the blow-pipe having the gather thereon is raised slightly above the other end thereof.

After the formation of the central cavity the blow-pipe is moved to a vertical position with the blank depending therefrom, as shown in Fig. 1$^f$, and the hollow portion of the blank allowed to elongate under the influence of gravity, the rotation of the blow-pipe at this time being preferably arrested. The blank having elongated to the desired extent is blown in a mold.

Figs. 2$^a$ to 2$^f$ show the steps of the process here sought to be patented which differs from that previously described herein chiefly in that it provides for a segregation of the gaged portion of the blank from the ungaged portion thereof, and is therefore to be preferred in that with a greatly excessive gather the large amount of glass forced back upon the blow-pipe by the gage mold sometimes, in the elongation, runs down the pipe and unites with the gaged glass beyond the end thereof, thus destroying the uniformity of the product.

The first step in the present process, viz., getting the gather upon the pipe, may, as shown in Fig. 2$^a$, be identical with the first step before described, as shown in Fig. 1$^a$. The second step in the preferred process differs from the second step as before described only in marvering between opposite surfaces C', which are brought into a definite relation with each other, so that the resultant blank is given a definite diameter and shape which is, in this case, preferably cylindrical, as shown in Fig. 2$^b$. The third step, viz. the gaging is identical with the third step before described, as is shown in Fig. 2$^c$. In carrying out the fourth step the gaged blank is again marvered into cylindrical shape and to a definite diameter, as it is the fourth step as before described, this being by preference done between marverers E' shown in Fig. 2$^d$ and at the same time a groove is formed in the portion of the blank surrounding the blow-pipe, by means of flanges $d$ on the marverer or marverers. This groove locally chills the glass adjacent thereto and will according to its depth and the extent to which it approaches the outside of the blow-pipe more or less completely segregate the gaged blank projecting from the end of the blow-pipe from the ungaged, and irregular and variable mass of glass which has been pushed back on the blow-pipe. By preference this groove is formed in the gaged portion of the blank or immediately above it, and it is formed at similar points in the successive gathers. The fifth and sixth steps are as shown in Figs. 2$^e$ and 2$^f$, the same as the fifth and sixth steps before described, but by reason of the segregation before effected of the gaged end of the blank from the mass on the blow-pipe, there will in the elongation be no downward flow of the latter, this being prevented by the chilling of the base thereof.

The blow-pipe is rotated during the steps represented in Figs. 2$^a$ to 2$^e$ in the same manner as it is during the steps shown in Figs. 1$^a$ and 1$^e$, but is by preference arrested during the elongation, and is by preference again rotated during the molding.

In the present process shown in Figs. 2$^a$ to 2$^f$, there is also the further advantage over that shown in Figs. 1$^a$ to 1$^f$, in that in the second and fourth steps of the latter (see Figs. 1$^b$ and 1$^d$) there is a tendency of the marverer to throw the blank being operated on out of the axial line of the blow-pipe, and hence to cause some variation in the size of the blank as finished, even though such axial line of the blow-pipe be brought within a definite and predetermined distance of the blow-pipe, whereas the use of the plurality of marverers shown in Figs. 2$^b$ and 2$^d$, this does not occur, as with them the diameter of the blank produced is due to the distance between the marvering faces, which are similarly varied in their distance from the axis of the blow-pipe, and the blank is prevented by the balanced pressures of such faces from moving out of the axial line of the blow-pipe.

To obtain a more perfect balanced condition of the pressures on the blank during the action thereon of the marverers, I prefer to cause the marverers to make contact with the glass at more than two points, which are so disposed that their pressures balance each other (as, for instance, is the case when the marverers are arranged at equi-distant points around the common center toward which they are moved in reducing the diameter of the blank) and whereby the blank is held against movement away from the center of the circle, which is defined by the three marvering points. In Fig. 3 I have shown how four marverers C' may be located at equi-distant points from each other around a common center toward which they are adapted to be moved to the desired and predetermined extent, to reduce the blank to the desired diameter. It is evident that such marverers can be used, not only for carrying out the step shown in Fig. 2ᵇ, but also that shown in Fig. 2ᵈ.

Suitable mechanism for carrying out the steps of the process forming the subject matter of this application is shown in my co-pending application, Serial Number 752,176, filed March 5, 1913, and in such application as filed I described and claimed the said process, and this present application, is therefore, in so far as I claim and described such process, a continuation of my said prior application of March 5, 1913, but I in this application make no claim to mechanisms or means by which such process may be carried out as the same is to form the subject-matter of the prior application, and of other applications.

As this application is directed to a process, I do not claim herein any mechanism for accomplishing such process, as apparatus therefor forms the subject-matter of other applications by me now pending in the United States Patent Office.

Having thus described my invention, what I claim is:

1. The hereinbefore described process of producing uniform bodies of glass for blowing consisting in placing upon irons masses of glass, gaging such glass masses upon the irons to render them uniform at least in part, segregating similar uniform portions of the masses from other parts thereof, and in elongating the segregated similar uniform portions of the several masses.

2. The hereinbefore described process of producing uniform bodies of glass for blowing, consisting in gathering masses of glass; working such glass masses to render them uniform in part, in segregating similar uniform portions of the several masses, and then elongating such segregated portions.

3. The hereinbefore described process of producing uniform bodies of glass for blowing, consisting in gathering upon irons masses of glass, working such glass masses upon the irons to render them uniform in parts, in segregating similar uniform portions of the several masses and in then elongating such segregated portions while on the irons.

4. The hereinbefore described process of producing uniform bodies of glass for blowing, consisting in gathering masses of glass, working such glass masses to render them uniform in part, in locally chilling such masses to segregate similar uniform portions of the several masses and in then elongating such segregated portions.

5. The hereinbefore described process of marvering a solid glass blank and reducing the diameter thereof, which consists in subjecting it to side pressure at more than two points so located that the pressures from such points balance each other until the blank is reduced to the desired diameter.

6. The hereinbefore described process of producing uniform bodies of glass for blowing, consisting in placing upon irons masses of glass, gaging such glass masses upon the irons by momentary contact to render them uniform at least in part, segregating similar uniform portions of the masses from other parts thereof and in elongating the segregated similar uniform portions of the several masses.

In testimony whereof I have signed my name in the presence of two witnesses.

BENJAMIN DAY CHAMBERLIN.

In the presence of—
DELPHINE KEAGLE,
G. WILLIS DRAKE.